Nov. 27, 1945.  C. S. HARRIS  2,389,853
ROLLER BOX FOR LATHES
Filed May 13, 1944
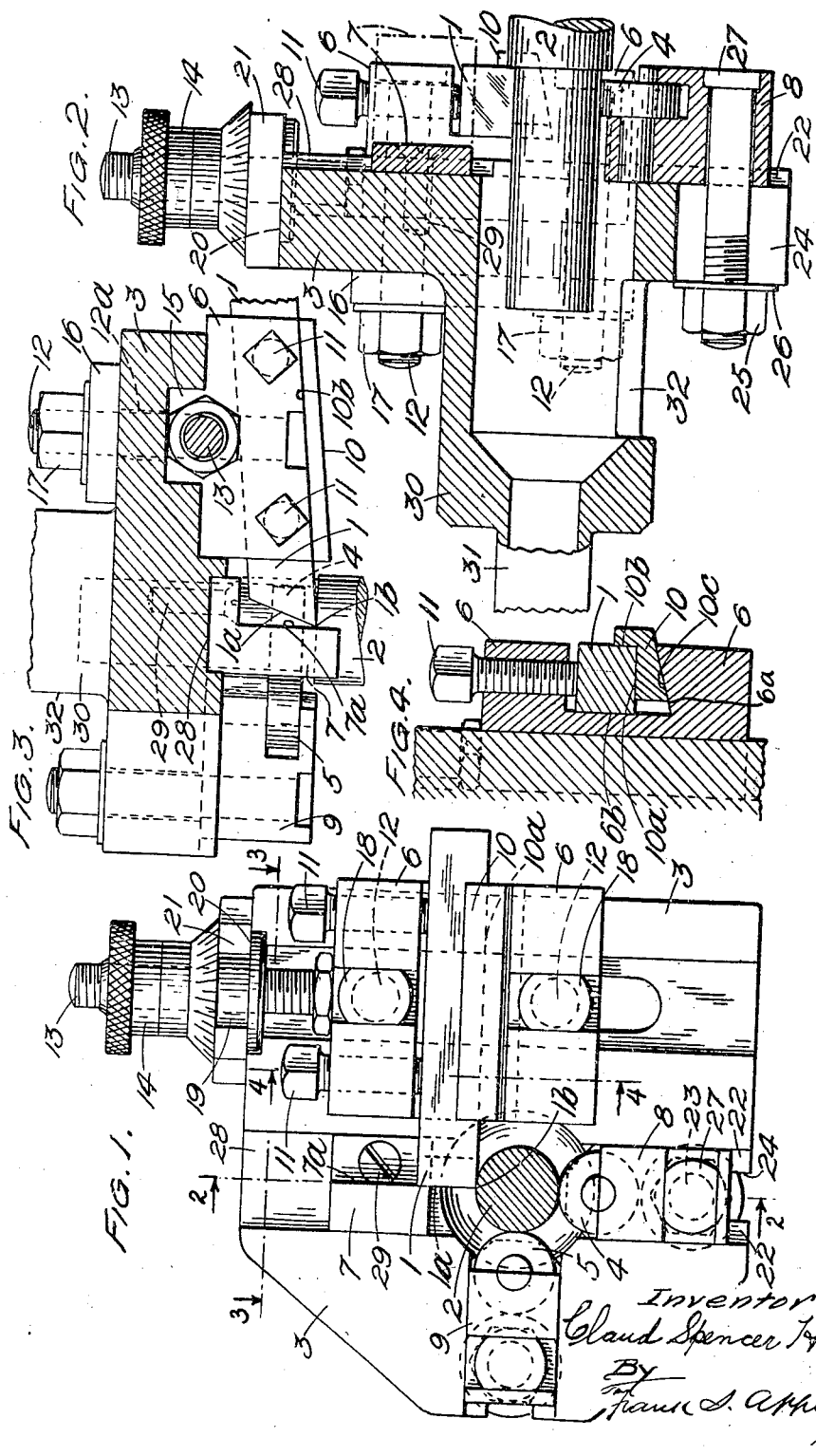
Inventor,
Claud Spencer Harris
By
Frank S. Appleman,
Atty.

Patented Nov. 27, 1945

2,389,853

UNITED STATES PATENT OFFICE 2,389,853

ROLLER BOX FOR LATHES

Claud S. Harris, Cirencester, England

Application May 13, 1944, Serial No. 535,470
In Great Britain April 16, 1943

7 Claims. (Cl. 82—35)

This invention relates to roller boxes for lathes. The object of the invention is the provision of improvements in roller boxes for lathes which will make it possible to fit the cutting tool, and to remove and replace it say for grinding, more easily and with the exercise of less skill than heretofore.

The invention consists broadly of a roller box for lathes, comprising a head adapted to move axially relative to the workpiece, a slide mounted on said head so as to be adjustable in a true straight line transversely of the axis of said workpiece, clamping means for clamping a cutting tool in said slide at a fixed accurately determined orientation, with said cutting tool transverse to the workpiece and transverse to the line of adjustment of said slide, said cutting tool being adjustable, relative to said slide, in a direction longitudinally of itself when said clamping means are loosened, a setting block fixedly mounted on said head, said setting block having a setting face accurately ground in a plane which is parallel to the line of adjustment of said slide, and such that, when said cutting tool is adjusted longitudinally of itself relative to said slide, so as to abut against said setting face, said cutting tool will always be at the correct longitudinal adjustment, two further slides mounted on said head so as each to be adjustable nearer to, and further from, the axis of the workpiece, and two rollers rotatably mounted on said slides respectively with their axes parallel to the axis of the workpiece, whereby said rollers may be adjusted to engage the periphery of the cut workpiece to support it against the thrust exerted by the cutting tool.

In order that the invention may be the more clearly understood, a roller box in accordance therewith will now be described, reference being made to the accompanying drawing, wherein:

Figure 1 is an end elevation of said roller box looking in the direction towards which said roller box is adapted to be fed when cutting;

Figure 2 is a sectional side elevation of the same on line A—B of Figure 1;

Figure 3 is a sectional plan on line C—D of Figure 1;

Figure 4 is a section on line E—F of Figure 1 showing the clamping means for the cutting tool.

Referring to the drawing, the cutting tool 1 is adapted to be fed in a direction axially of the rotating workpiece 2, so that it engages said workpiece from one end towards the other and reduces its diameter to the required amount. Looking at Figure 2 the cutting tool 1 will be fed from left to right. As shown, said cutting tool 1 is orientated tangentially to the workpiece with one corner of its edge 1a forming the cutting point 1b.

Said cutting tool 1 is carried and fed by a feed head 3 and this feed head has rotatably mounted on it, with their axes parallel to the axis of the workpiece, two bearing rollers 4 and 5, whose peripheries are adapted to engage the periphery of the workpiece, after it has been cut by the cutting tool, and thereby support said workpiece in opposition to the thrust exerted by said cutting tool. Thus these rollers 4 and 5, which are co-planar, are set a small distance rearwardly of the cutting point 1b of the cutting tool so that they engage the surface of the workpiece only after it has been cut.

Said cutting tool is mounted in a slide 6 which is adjustable relative to the feed head 3 in a direction transversely of said cutting tool 1 so as to be capable of adjusting the latter towards and away from the axis of the workpiece 2, and said cutting tool is capable of being adjusted, relative to said slide, in a direction longitudinally of itself, to such a position that the cutting point 1b of said cutting tool may be brought by said slide into correct tangential engagement with said workpiece. For all diameters of workpiece, the longitudinal adjustment of the cutting tool in the slide 6 should always be the same, and it is a feature of the invention that a setting block 7 is fixedly and permanently mounted on the feed head 3, which setting block has an accurately ground setting face 7a such that, when the cutting end of the cutting tool 1 abuts against said setting face, the longitudinal adjustment of said cutting tool in said slide is correct. Actually said seting face 7a is in a plane which is radial with respect to the axis of the workpiece.

The mounting of said cutting tool in the slide 6 is such that the orientation of said cutting tool must always be accurately the same to ensure that whatever the diameter of workpiece 2 being cut—that is to say whatever the degree of overlap between the cutting end and the setting face 7a—the cutting point 1b will always be correctly positioned when said cutting end abuts against said face 7a. In practice the cutting end of the cutting tool is so ground that its leading edge 1a abuts flush against the setting face 7a over the whole overlapping area, and rearwardly from said leading edge 1a the end of said tool is cut away at an angle of say 30° to the setting face, depending on the material being cut.

In addition, the line of adjustment of the slide 6 is accurately parallel to the plane of the setting face 7a so that, once the cutting tool has been adjusted with its edge 1a in abutment with the setting face 7a, the adjustment of said slide will leave said edge and cutting face in abutment.

In the construction shown, the workpiece being assumed horizontal, the setting block 7 is located above the workpiece with the setting face 7a vertical. The cutting tool 1 is therefore also above the workpiece and it is orientated horizontally. Said cutting tool 1 is however not orientated exactly at right angles to the axis of the workpiece but is inclined with its cutting end slightly forwards at an angle of say 7° as best shown in Figure 3.

The rollers 4 and 5 are mounted on respective slides 8 and 9 which are adjustable relative to the feed head 3 closer to, or further from, the axis of the workpiece. The roller 4 is adapted to engage the workpiece diametrically opposite to the cutting point 1b. This roller is thus mounted with its axis vertically underneath the axis of the workpiece and its slide 8 moves accurately in a vertical straight line.

The other roller 5 is spaced from the roller 4 in the direction of rotation of the workpiece. In practice the slide 9 of this roller 5 is adjustable in a horizontal line, which is radial with respect to the axis of the workpiece.

The cutting tool 1 is of strictly uniform square or rectangular cross section. For mounting said cutting tool in the slide 6, the latter comprises a separate elongated cradle 10 for receiving said cutting tool. This cradle 10 has an upwardly facing horizontal surface 10a on which the bottom horizontal face of the cutting tool rests and a rearwardly facing vertical surface 10b against which the front vertical face of said cutting tool rests. The under surface 10c of said cradle is inclined and rests on a similarly inclined surface 6a of the slide proper, the inclination being in such a sense that downward pressure on said cradle 10 causes the same to move rearwardly with respect to said slide 6. The rear vertical face of said cutting tool rests against a forwardly facing vertical surface 6b of the slide proper. The cutting tool 1 is held down in the cradle by means of two screws 11 in tapped holes in the slide proper 6, which screws press down on the top surface of said cutting tool, and it will be seen that the more tightly these screws are screwed up, not only will the bottom face of said cutting tool be the more tightly pressed against the horizontal surface 10a of the cradle, but, owing to the two inclined surfaces 10c and 6a, the rear face of said cutting tool will be pressed the more tightly against the vertical surface 6b of the slide proper.

As stated the slide 6 is mounted so as to be adjustable in a true vertical line with respect to the feed head 3. Bolts 12 are provided for clamping said slide 6 to said head 3 when the former is set to the required position.

For effecting the vertical adjustment of the slide relative to the head, a fine adjustment device of the micrometer type is provided. Thus a screwed bolt 13 extends upwardly from, and rigidly with, said slide, and mates with a nut 14 which is rotatable relative to the head but fixed in respect of axial movement. This nut has a calibrated scale and is provided with a milled flange for finger operation.

Describing now the constructional details, the feed head 3 is generally in the form of a thick plate in a plane at right angles to the axis of the workpiece. From the rear face of said feed head a boss 30 co-axial with the workpiece extends. As shown, said head 3 has a hole through it for giving access to the workpiece, which hole extends into the boss. Extending rearwardly from the boss 30 is a tubular extension 31. The boss is partly cut away as indicated at 32. The head is mounted by the boss 30 and extension 31 on the usual feeding slide as will be understood by those skilled in the art.

The slide 6 is formed with a vertical rib or tongue 15 (Figure 3) projecting from its rear face, and this tongue 15 engages slidingly in a corresponding vertical groove in the front face of the head 3, said tongue and groove being accurately cut to ensure true vertical movement of the slide. Said slide is held with the tongue in place in the groove by means of the two bolts 12. These pass completely through respective holes in the slide, and through a vertical slot 12a in the head 3 and through holes in a clamping plate 16 at the back of the head. Nuts 17 are screwed on to the bolts 12 at the back of this clamping plate, and the bolts 12 at their front ends are formed with straight sided heads 18 which lie in grooves in the front face of the slide 6 as shown, whereby the bolts are prevented from turning.

For preventing the nut 14 from moving axially it is formed with a downwardly depending reduced neck 19 (Figure 1) at the lower end of which is a flange 20. A horizontal plate 21 is secured on the top of the head 3, said plate being formed with a slot through it through which passes said neck 19. The upper surface of the flange 20 bears against the lower surface of the plate 21 and the lower surface of the nut 14 immediately above the neck 19 bears against the upper surface of said plate 21 and thus said nut is capable of rotating while being constrained against axial movement.

The slide 8 on which the roller 4 is mounted is accurately cut and slides in an accurately cut vertical groove 22 in the front face of the head 3 as shown. Said slide is held in place in said groove by means of a bolt 23 passing through a hole in said slide and through a vertical slot 24 in the head and having on its rearwardly projecting end a nut 25 and washer 26. To adjust said slide said nut 25 is loosened and said slide is slid up or down by the fingers, the nut being tightened again to clamp the slide in place when it is correctly adjusted. The bolt 23 is prevented from turning by a straight sided head 27 at its front end which lies in a groove in the front face of the slide 8 as shown.

The slide 9 is mounted and adjusted in the same way as the slide 8 and no further description thereof is deemed necessary.

The setting block 7 is an L-shaped member as shown, one limb of the L is secured against the front face of the head in an accurately fitting vertical groove 28 by means of a screw 29. The other limb of the L stands out from the front face of the head 3 and the surface 7a is formed on this latter limb.

The cross sectional shape of the cradle 10, and the details of the horizontal slot in the front face of the slide 6, which receives said cradle and the cutting tool 1, are deemed clear from the drawing. It will be appreciated that the cradle 10 is entirely free from the slide except for the clamping effect of the screws 11 as heretofore described.

In operation the screws 11 are first loosened and the cutting tool 1 is adjusted with respect to the slide 6 so that its edge 1a abuts against the setting face 7a (with a feeler of say .010 of an inch in between). Said cutting tool is then clamped to the slide 6 by means of the screws 11, and the slide is adjusted vertically by the micrometer nut 14 until, by trial and error, the workpiece 2 is cut to the correct diameter. The slide 6 is then clamped to the head 3 by means of the nuts 17 on the screws 12. The rollers 4 and 5 are then adjusted by means of their slides 8 and 9 against a short cut surface of the workpiece, and are clamped in place, whereupon the device is set.

If it is desired to remove and replace the cutting tool 1 (say for grinding) without changing the setting, said cutting tool is unclamped from its slide 6 and removed endways, and when it is replaced it can immediately be reset against the setting face 7a. When a diameter less than a certain amount is being cut, the edge 1a of said cutting tool 1 will be clear of the setting face 7a, and it will then be necessary to note the reading of the micrometer nut 14 at the set position, so that, for re-setting the tool 1 after removal, the slide 6 can be upwardly adjusted so that the tool can be set against the setting face as before, after which the micrometer nut is again screwed to the originally noted position.

What I claim and desire to secure by Letters Patent is:

1. A roller box for lathes, comprising a head adapted to move axially relative to the workpiece, a slide mounted on said head so as to be adjustable in a true straight line transversely of the axis of said workpiece, clamping means for clamping a cutting tool in said slide at a fixed accurately determined orientation, with said cutting tool transverse to the workpiece and transverse to the line of adjustment of said slide, said cutting tool being adjustable, relative to said slide, in a direction longitudinally of itself by unclamping and reclamping said clamping means, a setting block mounted on said head, said setting block having a setting face accurately ground in a plane which is parallel to the line of adjustment of said slide, and such that, when said cutting tool is adjusted longitudinally of itself relative to said slide, so as to abut against said setting face, said cutting tool will always be at the correct longitudinal adjustment, two further slides mounted on said head so as each to be adjustable nearer to, and further from, the axis of the workpiece, and two rollers rotatably mounted on said slides respectively with their axes parallel to the axis of the workpiece, whereby said rollers may be adjusted to engage the periphery of the cut workpiece to support it against the thrust exerted by the cutting tool.

2. A roller box according to claim 1, wherein the plane of the setting face of the setting block is radial with respect to the axis of the workpiece.

3. A roller box according to claim 1, and in which the cutting tool is of uniform rectangular cross section, wherein the means for clamping said cutting tool in said slide comprise a slot or keyway formed in said slide having a surface parallel to the line of adjustment of said slide, and an elongated L-section cradle located in said slot or keyway, said cutting tool being located with two adjacent faces flush against the two inner surfaces of said L-section cradle and with a third face flush against one of the surfaces of said slot or keyway, screw means being provided for exerting pressure on the fourth surface of said cutting tool, thereby pressing the opposite outer surface of said cradle flush against a second surface of said slot or keyway, and said last named two surfaces being so inclined that the pressure of the one on the other, by a cam action, forces said cradle towards the first named surface of said slot or keyway.

4. In a lathe construction, a head adapted to move axially relative to the workpiece, a slide mounted on said head so as to be adjustable in a true straight line transversely of the axis of said workpiece, clamping means for clamping a cutting tool in said slide at a fixed accurately determined orientation, with said cutting tool transverse to the workpiece and transverse to the line of adjustment of said slide, said cutting tool being adjustable, relative to said slide, in a direction longitudinally of itself by unclamping and reclamping said clamping means, and a setting block mounted on said head, said setting block having a setting face accurately ground in a plane which is parallel to the line of adjustment of said slide, and such that, when said cutting tool is adjusted longitudinally of itself relative to said slide, so as to abut against said setting face, said cutting tool will always be at the correct longitudinal adjustment.

5. In a lathe construction, a head adapted to move axially relatively to the workpiece, a slide mounted on said head so as to be adjustable transversely of the axis of the workpiece, clamping means for clamping a cutting tool of uniform rectangular cross section in said slide at a fixed accurately determined orientation, with said cutting tool transverse to the workpiece and transverse to the line of adjustment of said slide, said clamping means comprising a slot or keyway formed in said slide having a surface parallel to the line of adjustment of said slide, and an elongated L-section cradle located in said slot or keyway, said cutting tool being located with two adjacent faces flush against the two inner surfaces of said L-section cradle and with a third face flush against one of the surfaces of said slot or keyway, screw means being provided for exerting pressure on the fourth surface of said cutting tool, thereby pressing the opposite outer surface of said cradle flush against a second surface of said slot or keyway, and said last named two surfaces being so inclined that the pressure of the one on the other, by a cam action, forces said cradle towards the first named surface of said slot or keyway.

6. In a lathe construction, a carrier for a cutting tool of uniform rectangular cross section, and means for clamping said cutting tool in said carrier at an accurately determined orientation, said clamping means comprising a slot or keyway formed in said carrier, and an elongated L-section cradle located in said slot or keyway, said cutting tool being located with two adjacent faces flush against the two inner surfaces of said L-section cradle and with a third face flush against one of the surfaces of said slot or keyway, screw means being provided for exerting pressure on the fourth surface of said cutting tool, thereby pressing the opposite outer surface of said cradle flush against a second surface of said slot or keyway, and said last named two surfaces being so inclined that the pressure of the one on the other, by a cam action, forces said cradle towards the first named surface of said slot or keyway.

7. In a lathe construction, a carrier for an elongated cutting tool having at least three plane faces, and means for clamping said cutting tool in said carrier at an accurately determined orientation, said means comprising a recess formed in said carrier and having at least two plane surfaces, and an L-section cradle located in said recess, said cutting tool being located with two adjacent faces flush against the two inner surfaces of said L-section cradle and with a third face flush against one of said surfaces of said recess, screw means being provided for exerting pressure on said cutting tool in such a direction as to press an outer surface of said cradle flush against the other surface of said recess, said last named two surfaces being so inclined that the pressure of the one on the other, by a cam action, forces said cradle towards the first named surface of said recess.

CLAUD S. HARRIS.